US011392646B2

(12) United States Patent
Saito

(10) Patent No.: US 11,392,646 B2
(45) Date of Patent: Jul. 19, 2022

(54) INFORMATION PROCESSING DEVICE, INFORMATION PROCESSING TERMINAL, AND INFORMATION PROCESSING METHOD

(71) Applicant: SONY CORPORATION, Tokyo (JP)

(72) Inventor: Mari Saito, Kanagawa (JP)

(73) Assignee: SONY CORPORATION, Tokyo (JP)

(*) Notice: Subject to any disclaimer, the term of this patent is extended or adjusted under 35 U.S.C. 154(b) by 176 days.

(21) Appl. No.: 16/471,930

(22) PCT Filed: Nov. 1, 2018

(86) PCT No.: PCT/JP2018/040661
§ 371 (c)(1),
(2) Date: Jun. 20, 2019

(87) PCT Pub. No.: WO2019/098036
PCT Pub. Date: May 23, 2019

(65) Prior Publication Data
US 2019/0384795 A1    Dec. 19, 2019

(30) Foreign Application Priority Data
Nov. 15, 2017 (JP) .............................. JP2017-219983

(51) Int. Cl.
*G06F 16/9032* (2019.01)
*G06F 16/583* (2019.01)
*G06F 16/903* (2019.01)
*G10L 15/22* (2006.01)

(52) U.S. Cl.
CPC .... *G06F 16/90332* (2019.01); *G06F 16/5846* (2019.01); *G06F 16/90344* (2019.01); *G10L 15/22* (2013.01); *G10L 2015/223* (2013.01); *G10L 2015/225* (2013.01)

(58) Field of Classification Search
CPC .......... G06F 16/90332; G06F 16/5846; G06F 16/90344; G10L 15/22
See application file for complete search history.

(56) References Cited

U.S. PATENT DOCUMENTS

| 2011/0055256 A1* | 3/2011 | Phillips | G10L 15/30 707/769 |
| 2011/0123115 A1* | 5/2011 | Lee | G06V 10/235 382/229 |
| 2012/0116764 A1* | 5/2012 | Li | G10L 15/005 704/E15.001 |

(Continued)

*Primary Examiner* — Michael Colucci
(74) *Attorney, Agent, or Firm* — Paratus Law Group, PLLC

(57) ABSTRACT

There is provided an information processing device, an information processing terminal, and an information processing method which are capable of presenting a choice which is easily recognized by voice. The information processing device according to one aspect of the present technology acquires a plurality of pieces of presentation information to be presented as choices and causes a part which is not similar to the other presentation information among the respective pieces of presentation information to be presented in a form different from a similar part. The present technology can be applied to devices having a voice assistant function of assisting a behavior of a user.

15 Claims, 18 Drawing Sheets

(56) References Cited

U.S. PATENT DOCUMENTS

| | | | |
|---|---|---|---|
| 2013/0080174 A1* | 3/2013 | Nishiyama | G10L 15/22 704/260 |
| 2015/0170648 A1* | 6/2015 | King | G06F 3/0485 704/235 |
| 2018/0349380 A1* | 12/2018 | Chen | G10L 19/0018 |
| 2019/0251972 A1* | 8/2019 | Li | G06F 40/216 |

\* cited by examiner

FIG. 5

- AAA COFFEE MOMINE EST SHINJUKU STORE
→ AAA/COFFEE/ MOMINE/EST/SHINJUKU STORE

- AAA COFFEE NEW SQUARE BUILDING STORE
→ AAA/COFFEE/ NEW/SQUARE BUILDING STORE

- AAA COFFEE GATEWAY OSAKI STORE
→ AAA/COFFEE/ GATEWAY/OSAKI STORE

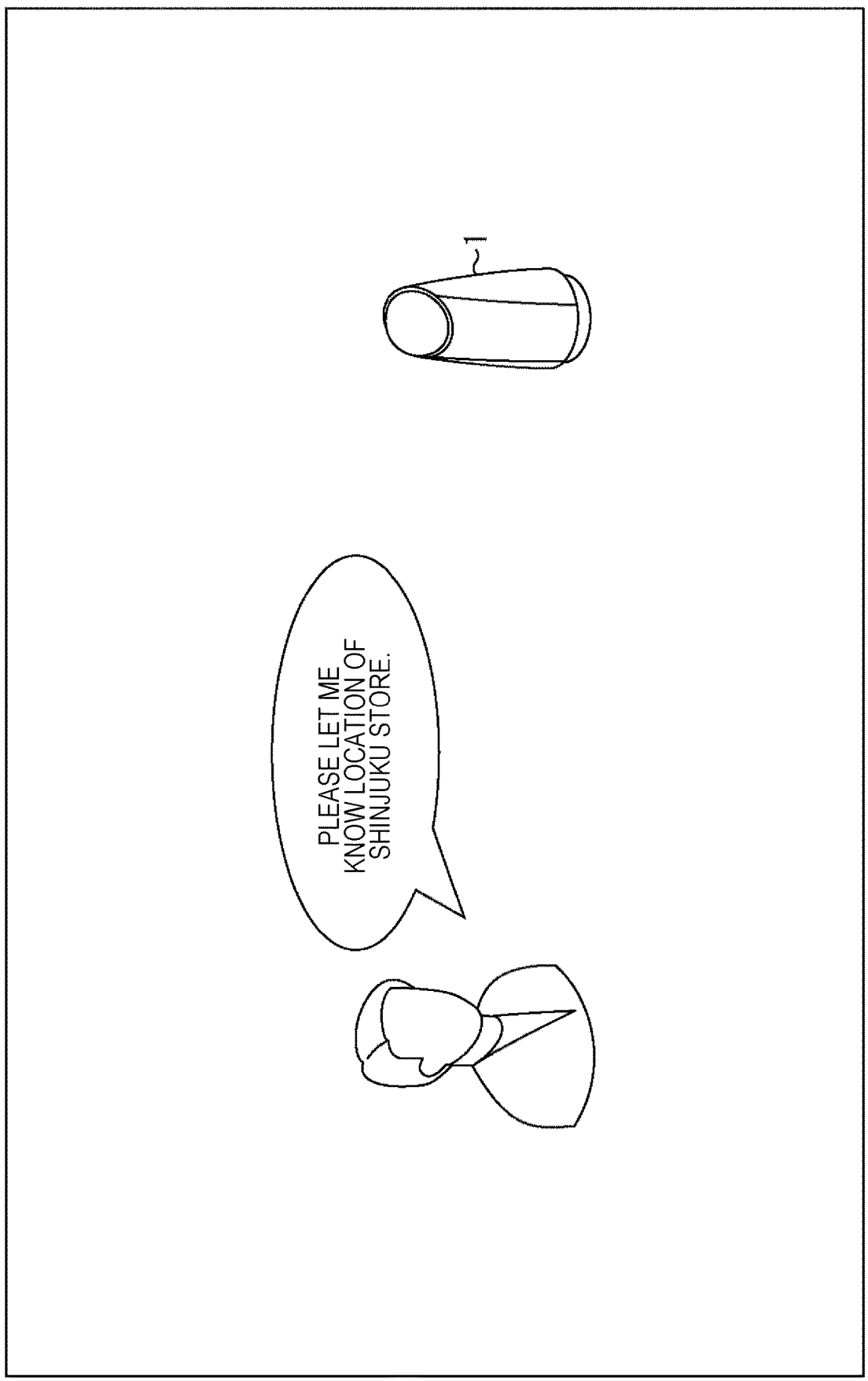

FIG. 7

SEARCH RESULTS FOR "SKY RESTAURANT"

11 SKY BEER GARDEN Gri Grill ~ GRI GRILL ~ SHINJUKU
TWO-MINUTE WALK FROM JR SHINJUKU STATION EAST EXIT  AVERAGE BUDGET: 3,000 YEN
SHINJUKU LARGEST ★ ROOFTOP BEER GARDEN♪
IMMEDIATE RESERVATION BY INTERNET
○ THERE IS PRIVATE ROOM SPACE TONIGHT
(BEER GARDEN) (LUNCH AND LUNCH PARTY) (OPEN TERRACE AND TERRACE SEATS AVAILABLE)
(ALL YOU CAN EAT) (SPECIALTY IN BEER)

— R11

12 SKY VIEW FOOD TRAIN (Sky View Food Train)
ONE-MINUTE WALK FROM SUBWAY MARUNOUCHI LINE IKEBUKURO STATION EXIT 19  AVERAGE BUDGET: 4,000 YEN
BEER GARDEN IN FRONT OF IKEBUKURO STATION
IMMEDIATE RESERVATION BY INTERNET (POINT EARNING)
(BARBEQUE) (FREE DRINKS) (LUNCH)

— R12

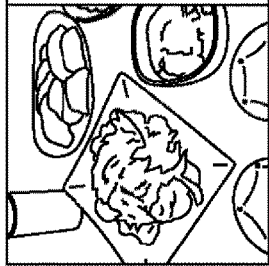

13 SHINJUKU AOZORA DINING SKY Court ~SKY COURT~
FOUR-MINUTE WALK FROM JR SHINJUKU STATION EAST EXIT  AVERAGE BUDGET: 3,000 YEN
BEER GARDEN/ALL YOU CAN EAT
IMMEDIATE RESERVATION BY INTERNET
○ SEATS AVAILABLE TONIGHT
(SMORGASBORD) (THERE ARE BIRTHDAY BONUS/SURPRISE) (ALL YOU CAN DRINK)
(PROUD OF PARFAIT) (PLENTY AMOUNT OF LUNCH)

— R13

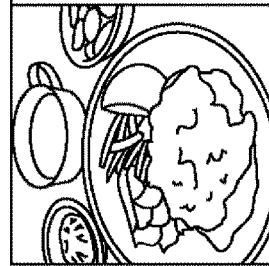

INFORMATION PROCESSING DEVICE, INFORMATION PROCESSING TERMINAL, AND INFORMATION PROCESSING METHOD

CROSS REFERENCE TO PRIOR APPLICATION

This application is a National Stage Patent Application of PCT International Patent Application No. PCT/JP2018/040661 (filed on Nov. 1, 2018) under 35 U.S.C. § 371, which claims priority to Japanese Patent Application No. 2017-219983 (filed on Nov. 15, 2017), which are all hereby incorporated by reference in their entirety.

TECHNICAL FIELD

The present technology relates to an information processing device, an information processing terminal, and an information processing method, and more particularly, to an information processing device, an information processing terminal, and an information processing method which are capable of presenting a choice which is easily recognized by voice.

BACKGROUND ART

Devices having a voice assistant function which can be operated by voice have attracted public attention. There are also devices including a display among devices called smart speakers.

In a case where there is information which a user desires to know about among information displayed on a display. The user uses a way of using of selecting information by voice and requesting presentation of detailed information.

A technology for emphasizing and displaying a part which can be operated by voice and giving and displaying a way of reading in a display screen which can be operated by voice is disclosed in Patent Document 1.

CITATION LIST

Patent Document

Patent Document 1: Japanese Patent Application Laid-Open No. 2007-171809

SUMMARY OF THE INVENTION

Problems to be Solved by the Invention

There are cases in which items which are difficult to be recognized by voice may be lined up and displayed as choices depending on a name (vocabulary) of an item. For example, in a case where items with similar pronunciation are lined up, an item different from ac item intended by a user may be selected.

The present technology was made in light of the foregoing and proposes a technique of presenting a choice which is easily recognized by voice.

Solutions to Problems

An information processing device according to an aspect of the present technology includes an acquiring unit that acquires a plurality of pieces of presentation information to be presented as choices and a presentation control unit that causes a part which is not similar to the other presentation information among the respective pieces of presentation information to be presented in a form different from a similar part.

An information processing terminal according to another aspect of the present technology includes a communication unit that receives a plurality of pieces of presentation information to be presented as choices which are transmitted from an information processing device connected via a network and a presentation control unit that causes a part which is not similar to the other presentation information among the respective pieces of presentation information to be presented in a form different from a similar part on the basis of the plurality of pieces of received presentation information.

In the present technology, a part which is not similar to the other presentation information among the respective pieces of presentation information is presented in a form different from a similar part.

Effects of the Invention

According to the present technology, it is possible to present a choice which is easily recognized by voice.

Further, the effects described herein are not necessarily limited, and any effect described in the present disclosure may be included.

BRIEF DESCRIPTION OF DRAWINGS

FIG. 5 is a diagram illustrating a word extraction example.

FIG. 6 is a diagram illustrating a search result selection example.

FIG. 7 is a view illustrating another search result selection example.

MODE FOR CARRYING OUT THE INVENTION

Hereinafter, a mode for implementing the present technology will be described. The description will proceed in the following order.
1. Information presentation in information processing system
2. Configuration of each device
3. Operation of each device
4. Presentation of information other than search result.
5. Modified example
6. Other examples

INFORMATION PRESENTATION IN
INFORMATION PROCESSING SYSTEM

Figure 1:
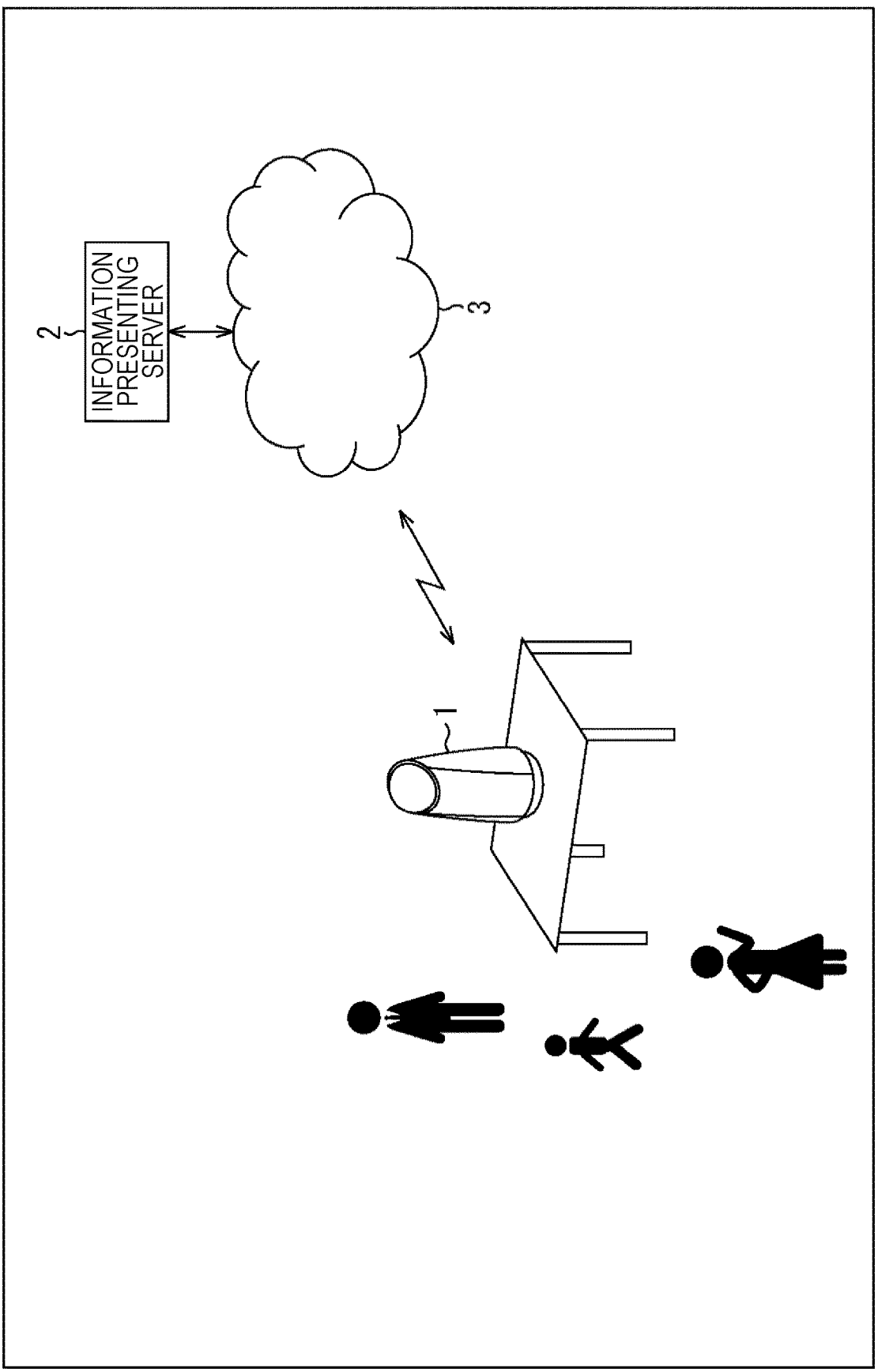
FIG. 1 is a diagram illustrating a configuration example of an information processing system according to an embodiment of the present technology.

FIG. 1 is a diagram illustrating a configuration example of an information processing system according to an embodiment of the present technology.

The information processing system of FIG. 1 is configured by connecting an information processing terminal 1 and an information presenting server 2 via the Internet 3.

The information processing terminal 1 is a device having a voice assistant function that performs various types of processes to support a behavior of a user using artificial intelligence (AI).

The function of the information processing terminal 1 is realized, for example, by performing communication with the information presenting server 2. For example, various types of functions such as a function of searching for and presenting information requested by the user, a function of managing a task of the user, and a function of transmitting an e-mail or a message of a social networking service (SNS) are realized by the information processing terminal 1 and the information presenting server 2.

The information processing terminal 1 is installed, for example, at a predetermined position at home. The information processing terminal 1 is connected to the Internet 3 via a router (not illustrated) or the like installed at home. In the example of FIG. 1, the information processing terminal 1 is a stationary device but may be a portable device such as a smartphone, a tablet terminal, or a wristwatch-type wearable device.

An operation on the information processing terminal 1 is mainly performed by a voice user interface (UI). The information processing terminal 1 includes a microphone for collecting a voice spoken by the user and a speaker for outputting synthetic voice and presenting various types of information to the user.

Further, presentation of information is also performed by a screen UI. The information processing terminal 1 includes an image display device for displaying a screen such as a projector or a display.

The information processing terminal 1 is a device that serves as an interface between the user and the information presenting server 2.

For example, as illustrated in FIG. 1, in a case where the user near the information processing terminal 1 makes a speech, the voice of the user is detected by the information processing terminal 1, and voice data is transmitted from the information processing terminal 1 to the information presenting server 2.

The information presenting server 2 performs voice recognition, semantic analysis of speech content, or the like on the basis of the voice data transmitted from the information processing terminal 1. For example, in a case where the user requests a search for information, the search for the information is performed, and a search result is obtained as presentation information to be presented to the user. The information presenting server 2 acquires for example, a plurality of pieces of presentation information and transmits the acquired presentation information to the information processing terminal 1.

The presentation information transmitted from the information presenting server 2 is received by the information processing terminal 1 and presented to the user as a choice by an image display device such as a projector.

The user who sees the presentation information selects predetermined presentation information by voice by speaking a name, for example. Thus, the user can confirm a search result from a screen displayed by the information processing terminal 1, for example, by requesting information search by voice.

Figure 2:
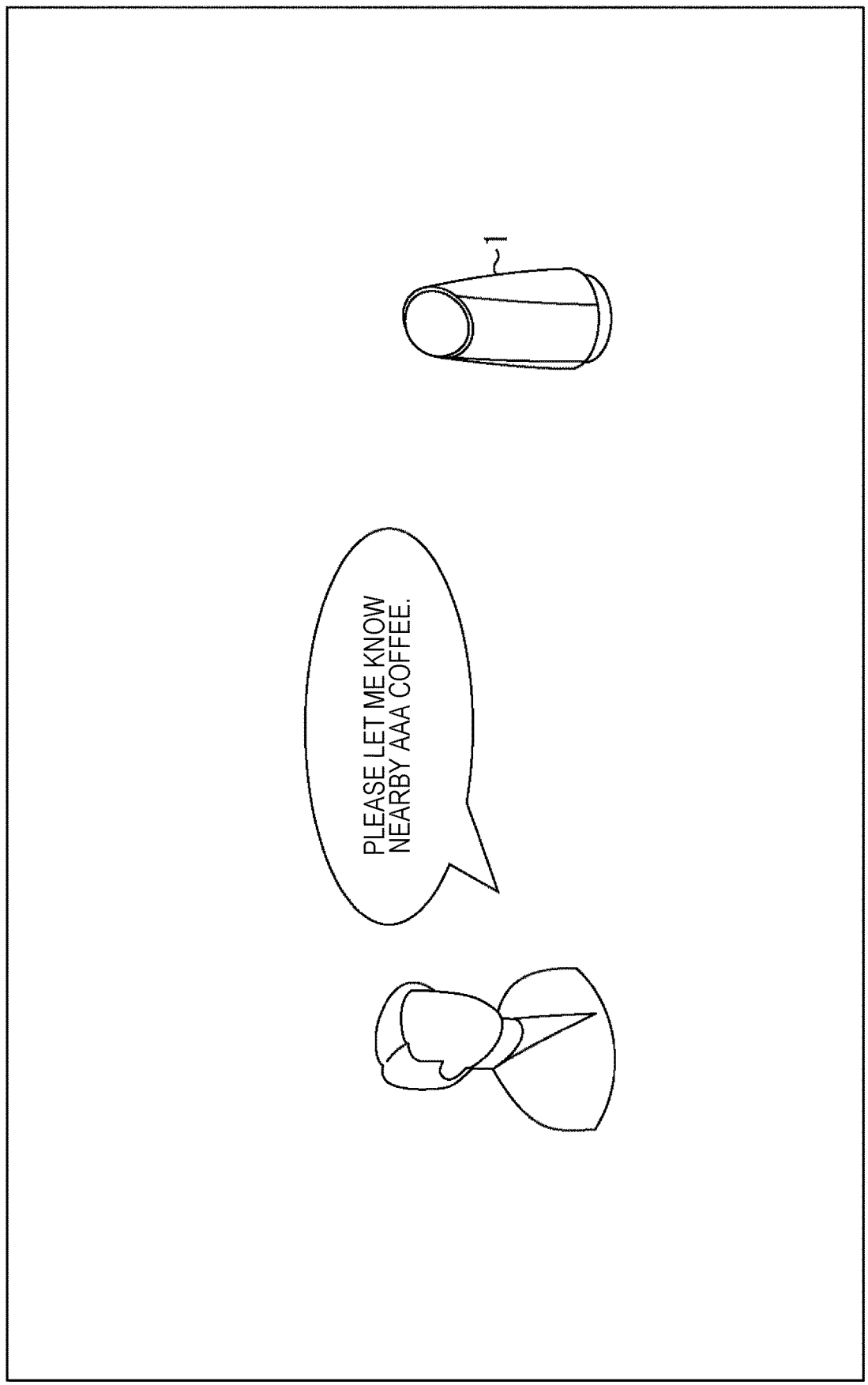
FIG. 2 is a diagram illustrating an example of an input using voice.

FIG. 2 is a diagram illustrating an example of an input using a voice.

Here, a case where the user searches for a "AAA coffee" store by speaking "Please let me know nearby AAA coffee shop" as illustrated in a word balloon of FIG. 2 will be described. "AAA coffee" is a name of a store commonly used in each chain store.

In the information presenting server 2, processes such as voice recognition and semantic analysis of speech content are performed, and stores nearby the user's home are searched on the basis of a keyword "AAA coffee" included in the speech of the user. Location information of the information processing terminal 1 is also used appropriately for the search.

For example, in a case where three stores are found as a search result, a voice "there are three stores. Which store information do you want to know?" is output, from the information processing terminal 1 on the basis of the information transmitted from the information presenting server 2 as illustrated in a word balloon of FIG. 3. Further, a screen displaying a search result is displayed by the information processing terminal 1 on the basis of the information transmitted from the information presenting server 2.

Figure 4:
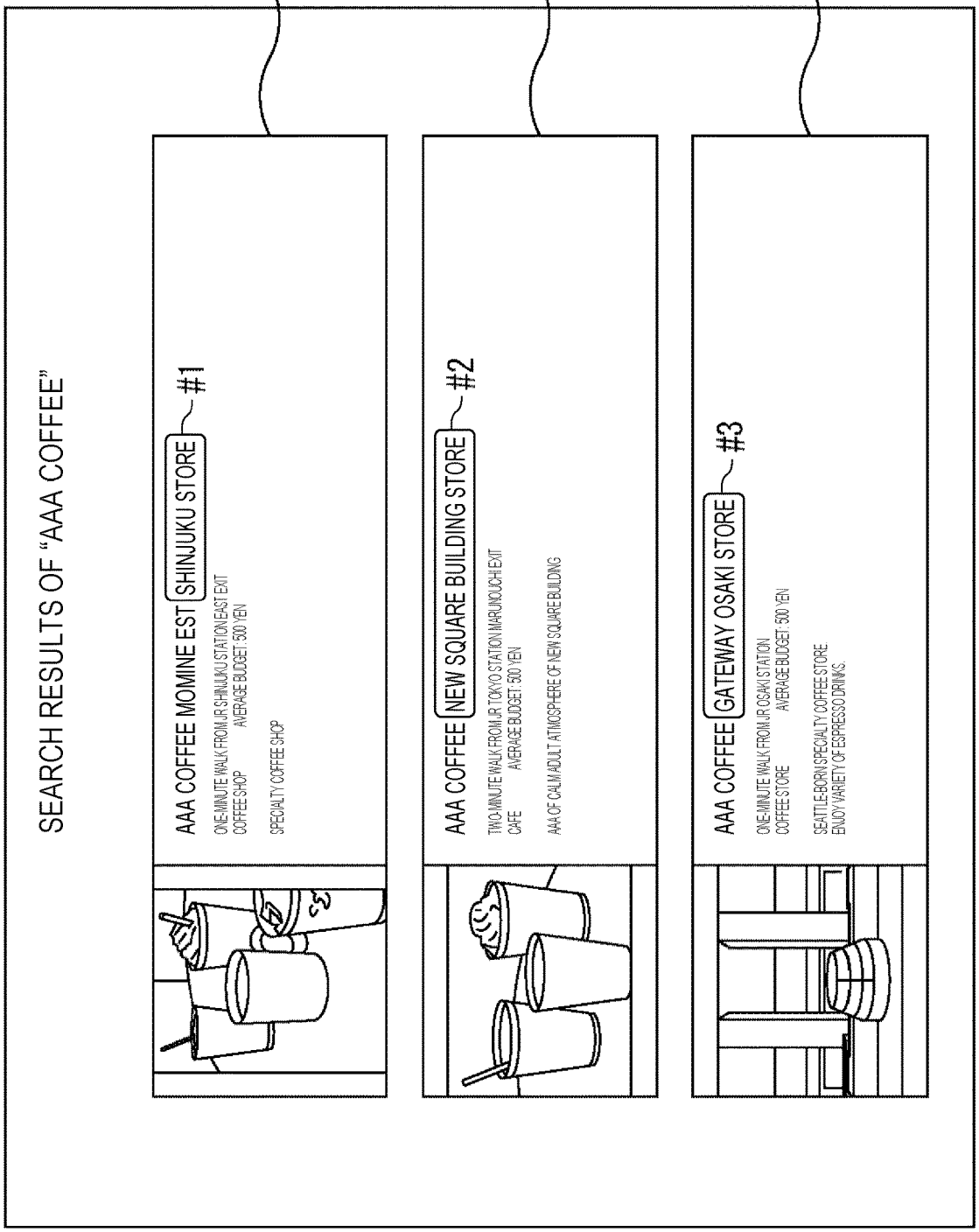
FIG. 4 is a diagram illustrating a search result display example.

FIG. 4 is a diagram illustrating a search result display example.

A screen illustrated in FIG. 4 is, for example, a screen which is projected onto a wall near the information processing terminal 1 by a projector incorporated in the information processing terminal 1.

Hereinafter, a case where screen display is performed using a projector will be mainly described, but a similar screen may be displayed on the display installed in the information processing terminal 1. Further, it may be displayed on a display connected to the information processing terminal 1.

In the example of FIG. 4, search results R1 to R3 are vertically lined and displayed. The search results R1 to R3 displayed in rectangular areas are information of "AAA coffee momine est Shinjuku store", "AAA coffee new square building store", and "AAA coffee gateway Osaki store".

An image picture of the store is displayed on the left of each search result area, and the name of the store is displayed on the right of the image picture. Detailed information such as a location, a store genre, an amount of money, and features of a store, are displayed below the name of the store. The detailed information is displayed on the basis of metadata of information acquired as the search result.

In the example of FIG. 4, a part of "Shinjuku store" in a character string of "AAA coffee Shinjuku store" which is a name of the search result R1 is surrounded by a frame #1 and emphasis-displayed.

Further, a part of "new square building store" in a character string of "AAA coffee new square building store" which is a name of the search result R2 is surrounded by a frame #2 and emphasis-displayed.

A part of "gateway Osaki store" in a character string of "AAA coffee gateway Osaki store" which is a name of the search result R3 is surrounded by a frame #3 and emphasis-displayed.

The emphasis display using an image of a frame indicates that a corresponding part is a part which the user is desired to speak in order to select the search result. A process of selecting a specific part from the character string of the name of the search result is performed in the information presenting server 2.

A part to be emphasis-displayed in the character string indicating the name of the store is specified, for example, by delimiting the entire character string into words and extracting words having not-similar pronunciation.

FIG. 5 is a diagram illustrating a word extraction example.

As illustrated in FIG. 5, the character string of "AAA coffee momine est Shinjuku store" which is the name of the search result R1 is delimited into words "AAA", "coffee", "momine", "est", and "Shinjuku store". Further, the character string of "AAA coffee new square building store" which is the name of the search result R2, is delimited into words "AAA", "coffee", "new", and "square building store". The character string of "AAA coffee gateway store" which is the name of the search result R3 is delimited into words "AAA", "coffee", "gateway", and "Osaki Store".

In the information processing terminal 1, for example, a degree of pronunciation similarity of each word is obtained, and character strings having not-similar sounds are extracted.

In the example of FIG. 5, as indicated by broken lines, the part "Shinjuku store" is extracted from the name of the search result R1, and the part "new square building store" is extracted from the name of the search result R2. Further, the part of "gateway Osaki store" is extracted from the name of the search result R3. In order to improve the accuracy of voice recognition, for example, a part of a predetermined length which is not too short is extracted.

The image of the frame is added to the character string extracted accordingly, and it is emphasis-displayed as illustrated in FIG. 4.

As a specific part is emphasis-displayed, the user can intuitively recognize that it is desirable to speak the emphasis-displayed part. For example, in a case where the search result R1 is selected, it is desirable for the user to speak "Shinjuku store".

FIG. 6 is a diagram illustrating a search result selection example.

For example, in a case where the user speaks "Please let me know location of Shinjuku store" as illustrated in a word balloon of FIG. 6, a process such as voice recognition is performed, and the selection of the search result R1 is accepted. Further, a map of "AAA momine est Shinjuku store" is displayed in accordance with the request of the user.

As described above, in a case where the information presented as a choice is similar in pronunciation, a part (character string) which is not erroneously recognized is extracted and presented to the user.

The part of "AAA coffee" is common to the names of the stores illustrated as the search results R1 to R3. Therefore, in a case where all the character strings of the names of the stores are caused to be spoken in order to select a predetermined store, misrecognition of voice recognition is likely to occur because parts with similar pronunciation are included.

Since a part with a not-similar pronunciation is emphasis-displayed, and the user is caused to speak the part as described above, the information presenting server 102 can prevent the misrecognition in a case where the user makes selection by voice. The misrecognition is reduced, and thus the user can select the presented information more efficiently by voice.

FIG. 7 is a diagram illustrating another search result display example.

For example, in a case where speech "search for sky restaurants" is performed, and search for stores is requested by the user, a search result illustrated in FIG. 7 is displayed.

In the example of FIG. 7, search results R11 to R13 are vertically lined up and displayed. The search results R11 to R13 are information of "Sky Beer Garden Gri Grill~Gri Grill~Shinjuku store", "Sky View Food Train", and "Shinjuku Aozora Dining SKY COURT~Sky Court~", respectively.

In the example of FIG. 7, a part of "Gri Grille" in the character string of "Sky Beer Garden Gri Grill~Gri Grill~Shinjuku store" which is a name of the search result R11 is surrounded by a frame #11 and emphasis-displayed.

Further, a part "Food Train" in the character string "Sky View Food Train" which is a name of the search result R12 is surrounded by a frame #12 and emphasis-displayed.

A part "Aozora Dining" in the character string "Shinjuku Aozora Dining SKY COURT~Sky Court~" which is a name of the search result R13 is surrounded by a frame #13 and emphasis-displayed.

As described above, in a case where various types of information such as the search results are presented as choices, a part with a not-similar pronunciation among the names of the choices is extracted and emphasis-displayed appropriately.

The entire character string of the name may be emphasis-displayed instead of a part of the character string of the name. For example, in a case where character strings "Cafe Blue" and "Cafe Blues" are presented, the whole "Cafe Blue" is emphasis-displayed for the former choice, and only "Blues" is emphasis-displayed for the latter choice.

The processes of the information processing terminal 1 and the information presenting server 2 for presenting a choice which is easily recognized by voice will be described later with reference to flowcharts. <Configuration of Each Device>

Configuration of Information Processing Terminal 1

Figure 8:
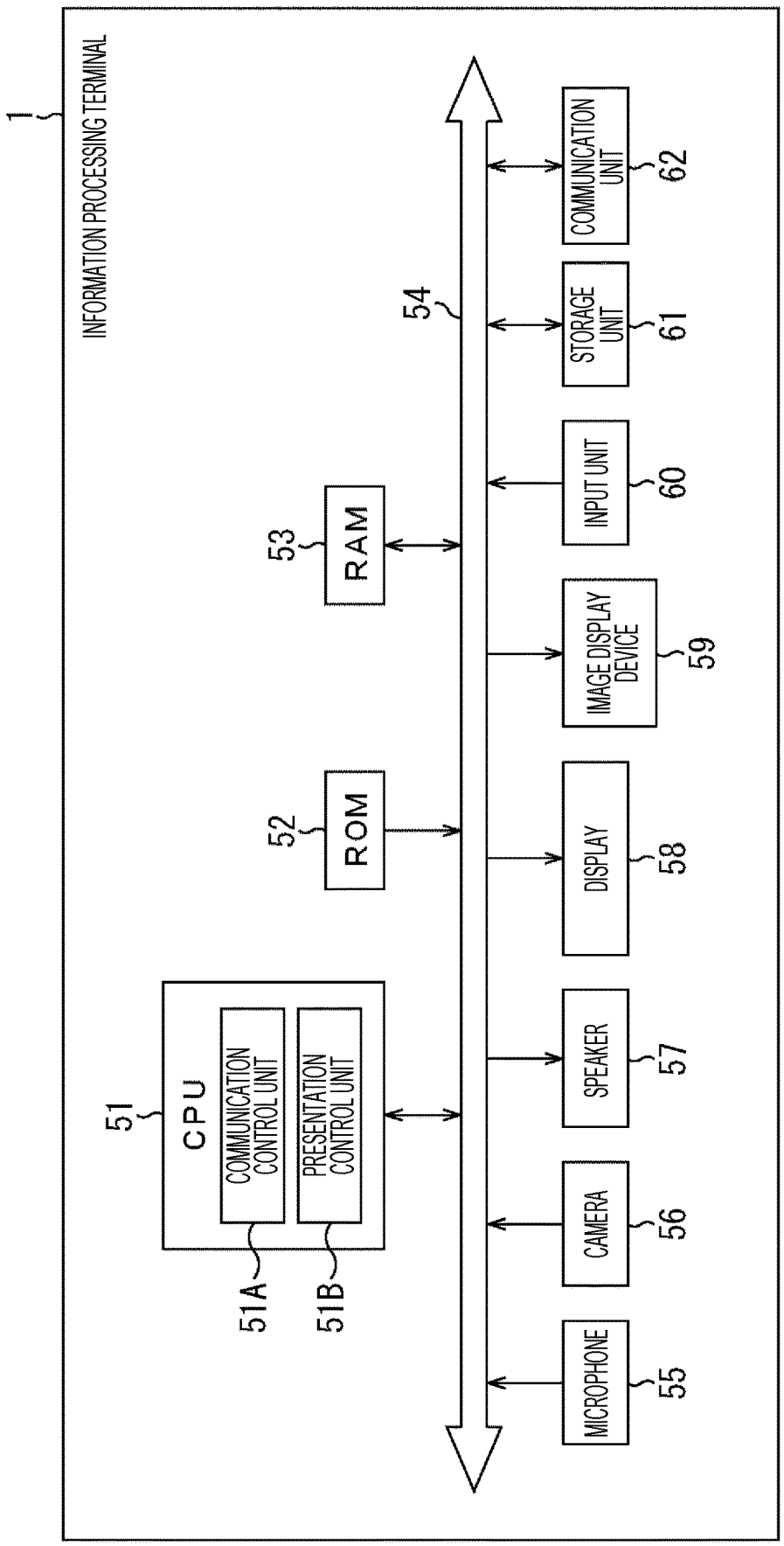
FIG. 8 is a block diagram illustrating a configuration example of an information processing terminal.

FIG. 8 is a block diagram illustrating a configuration example of the information processing terminal 1.

A central processing unit (CPU) 51, a read only memory (ROM) 52, and a random access memory (RAM) 53 are connected to one another via a bus 54.

In the CPU 51, a communication control unit 51A and a presentation control unit 51B are realized as a predetermined program is executed.

The communication control unit 51A controls a communication unit 62 such that communication with the information presenting server 2 is performed. For example, the communication control unit 51A transmits voice data to the information presenting server 2 in a case where the user speaks. Further, the communication control unit 51A receives information transmitted from the information presenting server 2. Data of a voice (synthetic voice) generated by text-to-speech (TTS), information of a display screen for displaying the presentation information, and the like are transmitted from the information presenting server 2.

The presentation control unit 51B controls presentation of information to the user. For example, the presentation control unit 51B controls a speaker 57 such that a voice is output on the basis of data transmitted from the information presenting server 2. Further, the presentation control unit 51B controls a display 58 or an image display device 59 such that a screen is displayed on the basis of data transmitted from the information presenting server 2.

A microphone 55, a camera 56, the speaker 57, the display 58, the image display device 59, an input unit 60, a storage unit 61, and the communication unit 62 are connected to the bus 54.

The microphone 55 detects a voice spoken by the user. Data of the voice detected by the microphone 55 is supplied to the communication unit 62 and transmitted to the information presenting server 2.

The camera 56 images a state around the information processing terminal 1 and outputs an image obtained by the imaging to the CPU 51. The image captured by the camera 56 is also transmitted to the information presenting server 2 appropriately. Various types of states are specified on the basis of the image captured by the camera 56.

The speaker 57 outputs a voice or music such as a BGM.

The display 58 includes a liquid crystal display (LCD), an organic electro luminescence (EL) display, or the like. The display 58 displays various types of screens such as a menu screen and the search result screen described above.

The image display device 59 is, for example, a projector. The image display device 59 projects various types of screens such as the search result screen described with reference to FIG. 4 onto a wall surface, a floor surface, or the like.

The input unit 60 includes a touch panel installed superimposed on the display 58 or various types of buttons installed in a housing of the information processing terminal 1. The input unit 60 detects an operation by user and outputs information indicating content of the operation.

The storage unit 61 includes a non-volatile memory or the like. The storage unit 61 stores various types of data such as a program executed by the CPU 51.

The communication unit 62 includes a network interface or the like. The communication unit 62 communicates with the information presenting server 2 via the Internet 3.

Various types of sensors such as an acceleration sensor, a gyro sensor, and a positioning sensor may be installed in the information processing terminal 1.

Configuration of Information Presenting Server 2

Figure 9:
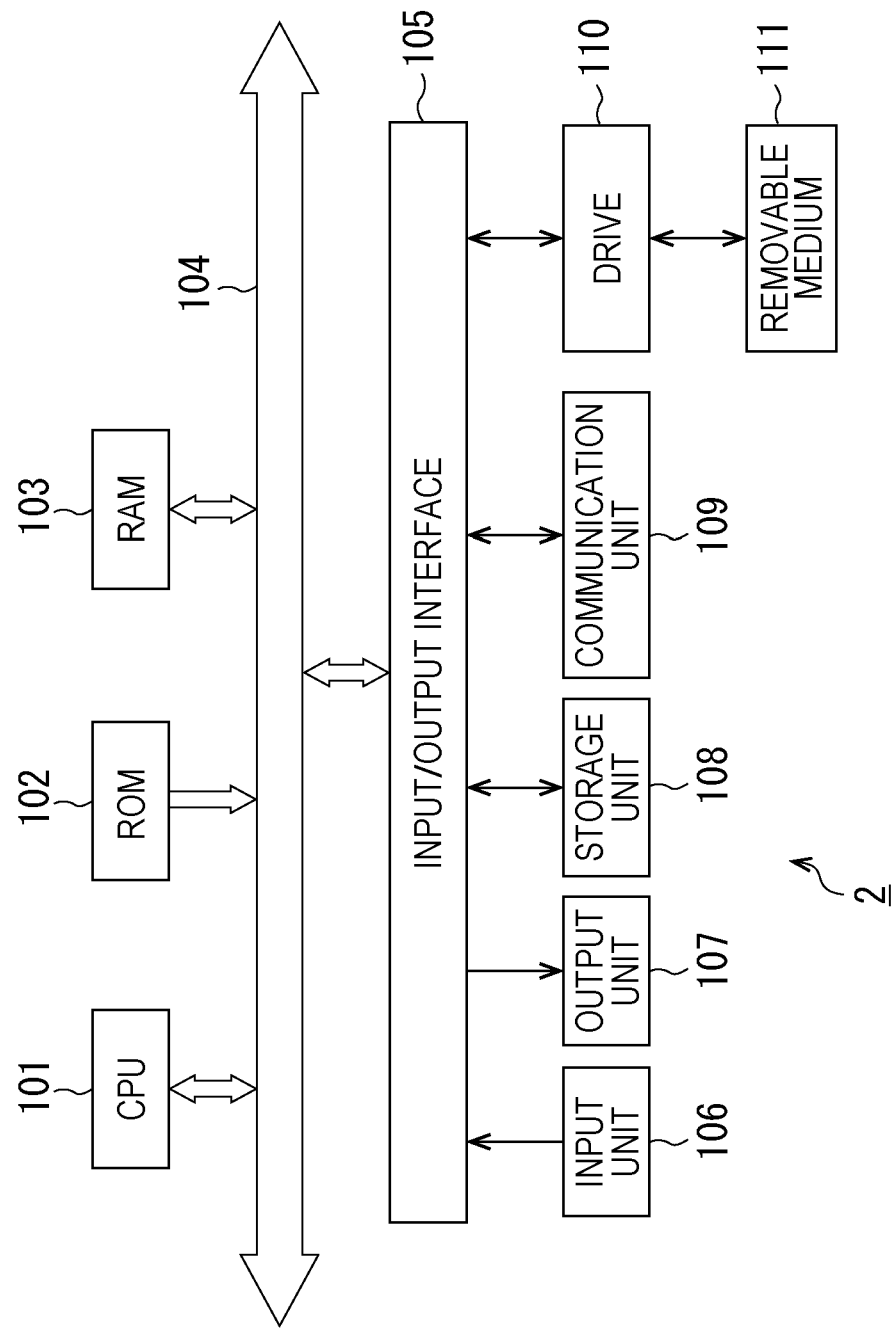
FIG. 9 is a block diagram illustrating a hardware configuration example of an information presenting server.

FIG. 9 is a block diagram illustrating an example of a hardware configuration of the information presenting server 2.

A CPU 101, a ROM 102, and a RAM 103 are connected to one another via a bus 104.

An input/output interface 105 is connected to the bus 104. An input unit 106 including a keyboard, a mouse, or the like and an output unit 107 including a display, a speaker, or the like are connected to the input/output interface 105. Further, a storage unit 108 including a hard disk, a non-volatile memory, or the like, a communication unit 109 including a network interface or the like, and a drive 110 for driving a removable medium 111 are connected to the input/output interface 105.

In this example, the information presenting server 2 is assumed to be constituted by one computer but may be constituted by a plurality of computers. The functions of the information presenting server 2 are realized as a plurality of computers perform processes in cooperation.

Figure 10:
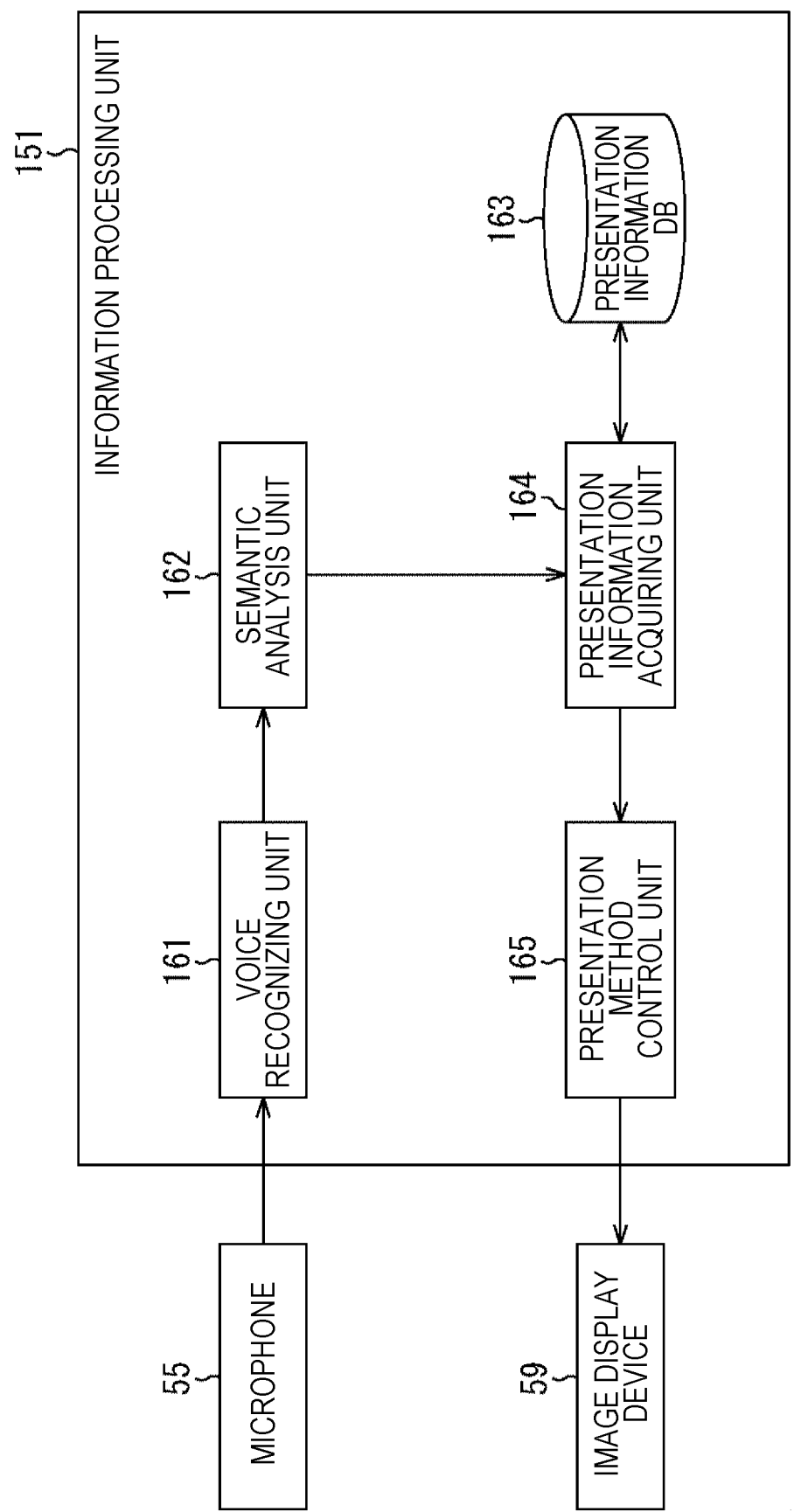
FIG. 10 is a block diagram illustrating a functional configuration example of an information presenting server.

FIG. 10 is a block diagram illustrating an example of a functional configuration of the information presenting server 2. At least some of the components illustrated an FIG. 10 are realized as the CPU 101 of FIG. 9 executes a predetermined program.

As illustrated in FIG. 10, an information processing unit 151 is realized in the information presenting server 2. The information processing unit 151 includes a voice recognizing unit 161, a semantic analysis unit 162, a presentation information DR 163, a presentation information acquiring unit 164, and a presentation method control unit 165.

Further, for the sake of convenience of description, the microphone 55 and the image display device 59 which are the components of the information processing terminal 1 are illustrated in FIG. 10. The voice data which is detected by the microphone 55 in accordance with the speech of the user and transmitted from the information processing terminal 1 is received by the communication unit 109 and input to the voice recognizing unit 161. Further, information of the display screen output by the presentation method control unit 165 is transmitted from the communication unit 109 to the information processing terminal 1 and is used to display the screen in the image display device 59.

The voice recognizing unit 161 recognizes the voice of the user, and outputs a character string indicating a recognition result to the semantic analysis unit 162.

The semantic analysis unit 162 analyzes the meaning of the speech content of the user on the basis of the character string supplied from the voice recognizing unit 161. Information indicating the analysis result of the meaning of the speech of the user is supplied to the presentation information acquiring unit 164.

The presentation information acquiring unit 164 reads and acquires the presentation information such as information of the search result from the presentation information DB 163 on the basis of the analysis result by the semantic analysis unit 162. Various types of information are stored in the presentation information DB 163. Information to be presented to the user may be acquired from other servers on the Internet 3 or other devices such as the portable terminal of the user. The presentation information acquiring unit 164 outputs the acquired presentation information to the presentation method control unit 165.

The presentation method control unit 165 controls the image display device 59 such that the screen including the presentation information supplied from the presentation information acquiring unit 164 is displayed. The presentation method control unit 165 controls the presentation method by emphasis-displaying not-similar parts, for example, in a case where the information presented as the choice is similar in pronunciation.

OPERATION OF EACH DEVICE

Here, operations of the information processing terminal 1 and the information presenting server 2 will be described.

Operation of Information Processing Terminal 1

Figure 11:
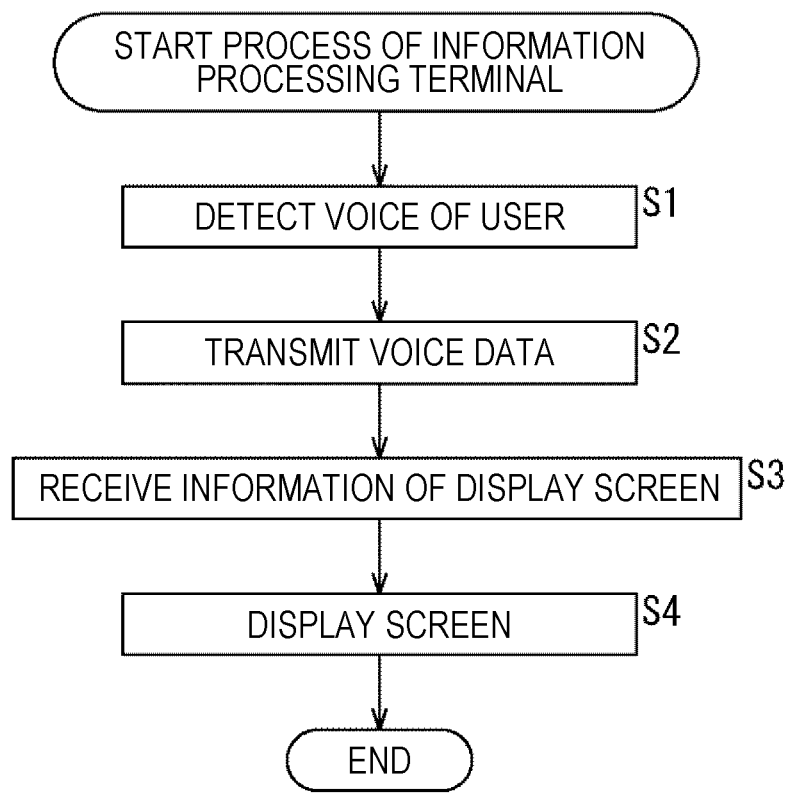
FIG. 11 is a flowchart illustrating a process of an information processing terminal.

First, a process of the information processing terminal 1 will be described with reference to the flowchart of FIG. 11.

In step S1, the microphone 55 detects the voice of the user.

In step S2, the communication control unit 51A transmits the voice data to the information presenting server 2.

The information presenting server 2 which has received the voice data performs information search and transmits information of the display screen to the information processing terminal 1. In a case where a voice is output in accordance with display of a screen, the information presenting server 2 also transmits the voice data appropriately.

In step S3, the communication control unit 51A receives information of the display screen transmitted from the information presenting server 2.

In step S4, the presentation control unit 51B outputs the information transmitted from the information presenting server 2 to the image display device 59 so that the screen including the presentation information is displayed.

Such a process is performed each time the user speaks.

Operation of Information Presenting Server 2

Next, a process of the information presenting server 2 will be described with reference to the flowchart of FIG. 12.

Figure 12:
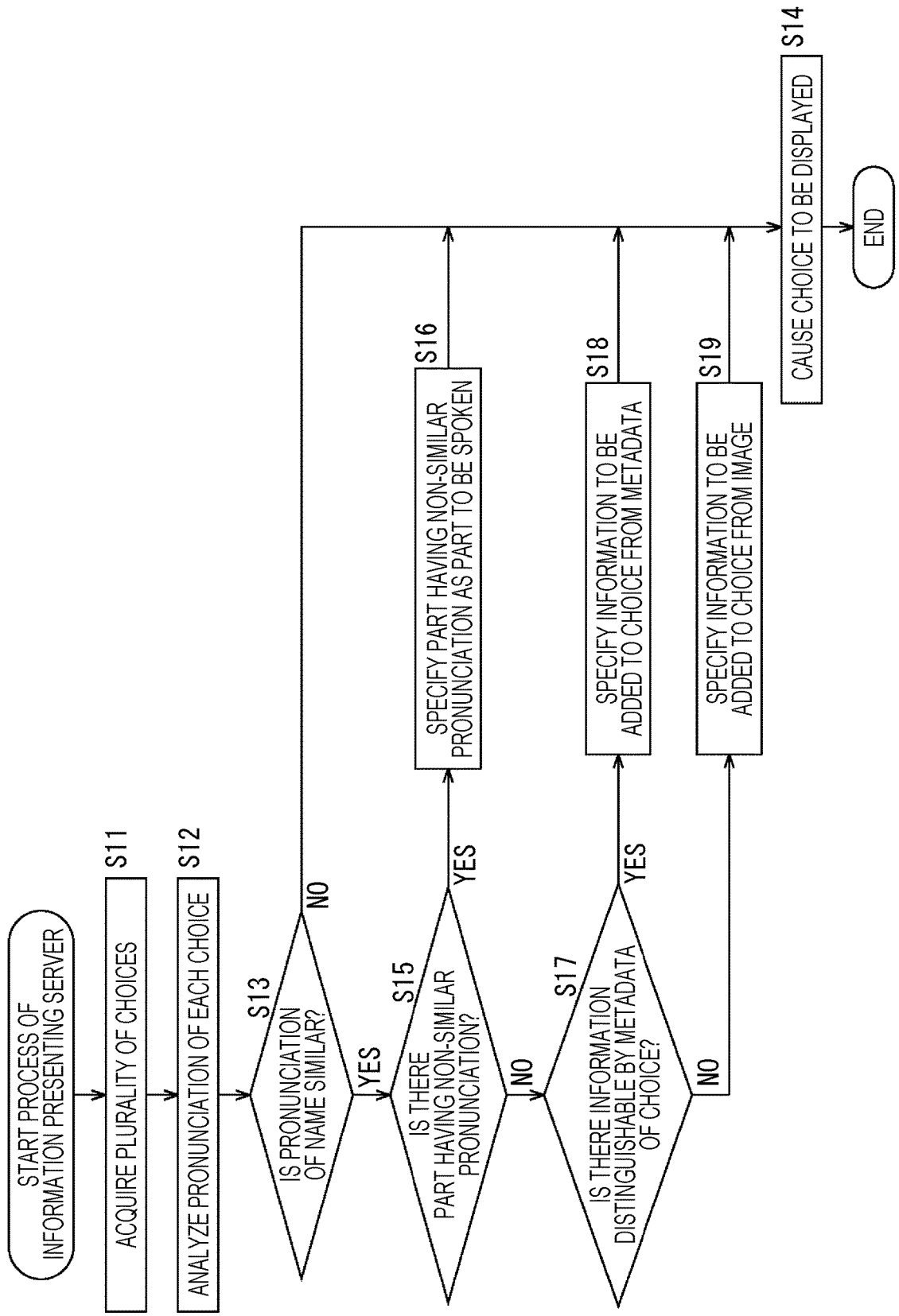
FIG. 12 is a flowchart illustrating a process sing of an information processing device.

The process of FIG. 12 is started when voice recognition is performed in the voice recognizing unit 161 on the basis of the voice data transmitted from the information processing terminal 1, and information indicating the analysis result of the meaning of the speech content of the user is input from semantic analysis unit 162 to the information acquiring unit 164.

In step S11, the presentation information acquiring unit 164 acquires a plurality of pieces of presentation information to be presented as choices from the presentation information DB 163 on the basis of the analysis result of the meaning of the speech of the user. The presentation information presented as the choices is information which can be selected by voice.

In step S12, the presentation method control unit 165 analyzes pronunciations of names of the respective choices.

In step S13, the presentation method control unit 165 determines whether or not the pronunciations of the names of the respective choices are similar.

In a case where it is determined in step S13 that the pronunciations of the names of the respective choices are not similar, in step S14, the presentation method control unit 165 transmits the information of the display screen to the information processing terminal 1 so that the information of the choices are displayed without change. In this case, even in a case where misrecognition is unlikely to occur even though all the names are pronounced, emphasis-displaying is not performed.

On the other hand, in a case where it is determined in step S13 that the pronunciations of the names of the respective choices are similar, in step S15, the presentation method control unit 165 determines whether or not there is a part having a not-similar pronunciation.

In a case where it is determined in step 15 that there is a part having a not-similar pronunciation, in step S16, the presentation method control unit 165 specifies a part having a not-similar pronunciation in the character string of the name as a part to be spoken, that is, a part to be emphasis-displayed.

Thereafter, in step S14, the presentation method control unit 165 transmits the information of the display screen to the information processing terminal 1 so that the respective choices are displayed in a form in which the non-similar parts are emphasis-displayed.

Accordingly, for example, as illustrated in FIG. 4, a screen of a search result in which parts such as "Shinjuku store", "new square building store", and "gateway Osaki store" are emphasis-displayed is displayed. The user can select a predetermined choice by speaking an emphasis-displayed part such as "Please let me know location of Shinjuku store."

On the other hand, in a case where it is determined in step S15 that there is no part having a non-similar pronunciation in the name of the choice, the process proceeds to step S17.

In step S17, the presentation method control unit 165 determines whether or not information for distinguishing each choice in a case where it is spoken is included in metadata of each choice. As described above, each piece of information presented to the user as the choice includes the detailed information such as the location, the store genre, the amount of money, and the features of the store, as the metadata.

In a case where it is determined in step S17 that the information for distinguishing each choice is included in the metadata, in step S18, the presentation method control unit 165 specifies the information for distinguishing each choice from the metadata as information to be added to the name of the choice.

Thereafter, in step S14, the presentation method control unit 165 transmits the information of the display screen to the information processing terminal 1 so that the respective choices are displayed in a form in which the information specified from the metadata is added to the name. The additional information added to the name of the choice is emphasis-displayed.

For example, in a case where stores having the same name are presented as the choices, information identifying the respective stores when spoken such as a location, a nearest station, or a genre name is specified as additional information, added to the names of the stores, and emphasis-displayed.

Specifically, in a case where all the names of the search results R1 to R3 described with reference to FIG. 4 are set as "AAA coffee", "Shinjuku store", "new square building store", and "gateway Osaki store" indicating the locations of the respective stores are specified from the metadata of the search results R1 to R3. Further, as illustrated in FIG. 4, the parts of "Shinjuku store", "new squire building store", and "gateway Osaki store" are added to the name of "AAA coffee" and emphasis-displayed.

As the additional information, a keyword indicating the feature of the store such as a menu of interest or a sales point may be used. Such a keyword is also included in the metadata.

Specifically, it is assumed that all the names of the search results R11 to R13 described with reference to FIG. 7 are set as "sky restaurant". It is assumed that information such as "beer garden", "all you can eat", . . . , and the like is included in the metadata of the search result R11, and information such as "barbecue", "free drinks", . . . , and the like is included in the metadata of the search result R12. It is assumed that information such as "smorgasbord", "proud of parfait", . . . , and the like is included in the metadata of the search result R13.

Figure 13:
FIG. 13 is a diagram illustrating another search result display example.

In this case, as illustrated in FIG. 13, additional information "all you can eat" indicating the sales point of the store of the search result R11 is added to the character string "sky restaurant" of the name of the search result R11 and surrounded by a frame #21 to be emphasis-displayed.

Further, additional information "free dunk" indicating the feature of the store of the search result R12 is added to the character string"sky restaurant" of the name of the search result R12 and surrounded by a frame #22 to be emphasis-displayed.

Additional information "proud of parfait" indicating the feature of the store of the search result R13 is added to the character string "sky restaurant" of the name of the search result R13 and surrounded by a frame #23 to be emphasis-displayed.

When the user selects the store of the search result R13, the user speaks "Please let me know details of store of proud of parfait.", for example The user speaks the sales point, of the store on his/her own, so that the user's interest in the store can be increased.

Returning to the description of FIG. 12, in a case where it is determined in step S17 that the information for distinguishing each choice is not included in the metadata, the process proceeds to step S19.

In step S19, the presentation method control unit 165 identifies information to be added to the choice from the image. As described above, the image such as the image picture is included in the information presented as the choice. For example, the presentation method control unit 165 analyzes the image of each piece of presentation information, and specifies a keyword indicating a feature of the subject shown in an image as the additional information.

Thereafter, in step S14, the presentation method control unit 165 transmits the information of the display screen to the information processing terminal 1, and causes each choice to be displayed in a form in which the information specified from the image is added to the name.

For example, in a case where a blue table is shown in the image picture of the search result R13 illustrated in FIG. 13, additional information "blue table" indicating the feature of the subject shown in the image picture is added to the character string "sky restaurant" of the name of the search result R13 and emphasis-displayed.

In a case where the user selects the store of the search result R13, the user speaks "Please let me know details of store of blue table.", for example.

As in the above process, in a case where the pronunciations of the names of the choices are similar, a process of identifying and emphasis-displaying a part having a non-similar pronunciation is performed as a first step process for presenting the choices.

Further, as a second step process for presenting the choices, a process of specifying additional information for distinguishing each choice from the metadata, adding the additional information to the name, and emphasis-displaying the additional information is performed.

Further, as a third step process for presenting the choices, a process of specifying additional information from the image, adding the additional information to the name, and emphasis-displaying the additional information is performed.

Accordingly, the information presenting server 2 can generate the choices which is unlikely to cause misrecognition even in a case where the selection is made by voice and present the choices to the user.

Figure 14:
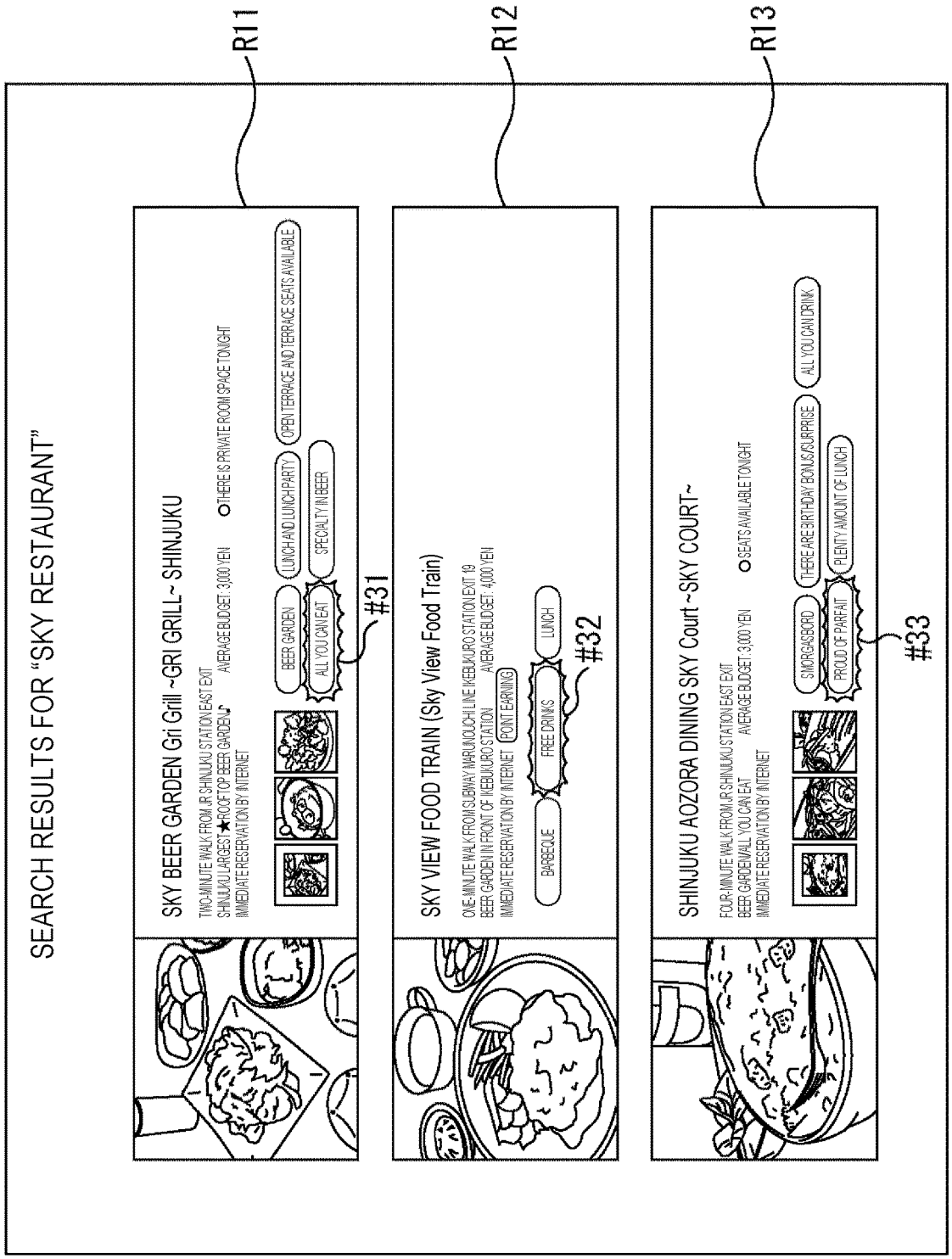
FIG. 14 is a diagram illustrating another search result display example.

FIG. 14 is a diagram illustrating another search result display example.

The part of the name presented as the choice may not be an emphasis-displayed part, but the part of the detailed information may be emphasis-displayed as illustrated in FIG. 14.

In the example of FIG. 14, the part "all you can eat" in the detailed information of the search result R11 is emphasis-displayed by a frame #31. Further, the part "free drink" in the detailed information of the search result R12 is emphasis-displayed by a frame #32. The part "proud of parfait" in the detailed information of the search result R13 is emphasis-displayed by a frame #33.

As described above, the information presenting server 2 can cause various types of information which are desired to be spoken by the user to be emphasis-displayed in addition to the name of the choice.

Further, in the example of FIG. 14, an image of a frame used for emphasis-displaying is an image of a dotted line. As described above, it is possible to employ various types of methods as the emphasis-displaying method.

For example, emphasis-displaying may be achieved by displaying a part to be emphasis-displayed in a more prominent color than in the other parts or making a font size of a part to be emphasized larger than a font size of the other parts instead of the method using the image of the image.

PRESENTATION OF INFORMATION OTHER THAN SEARCH RESULT

Next, a case where information other than search result is presented will be described.

Figure 15:
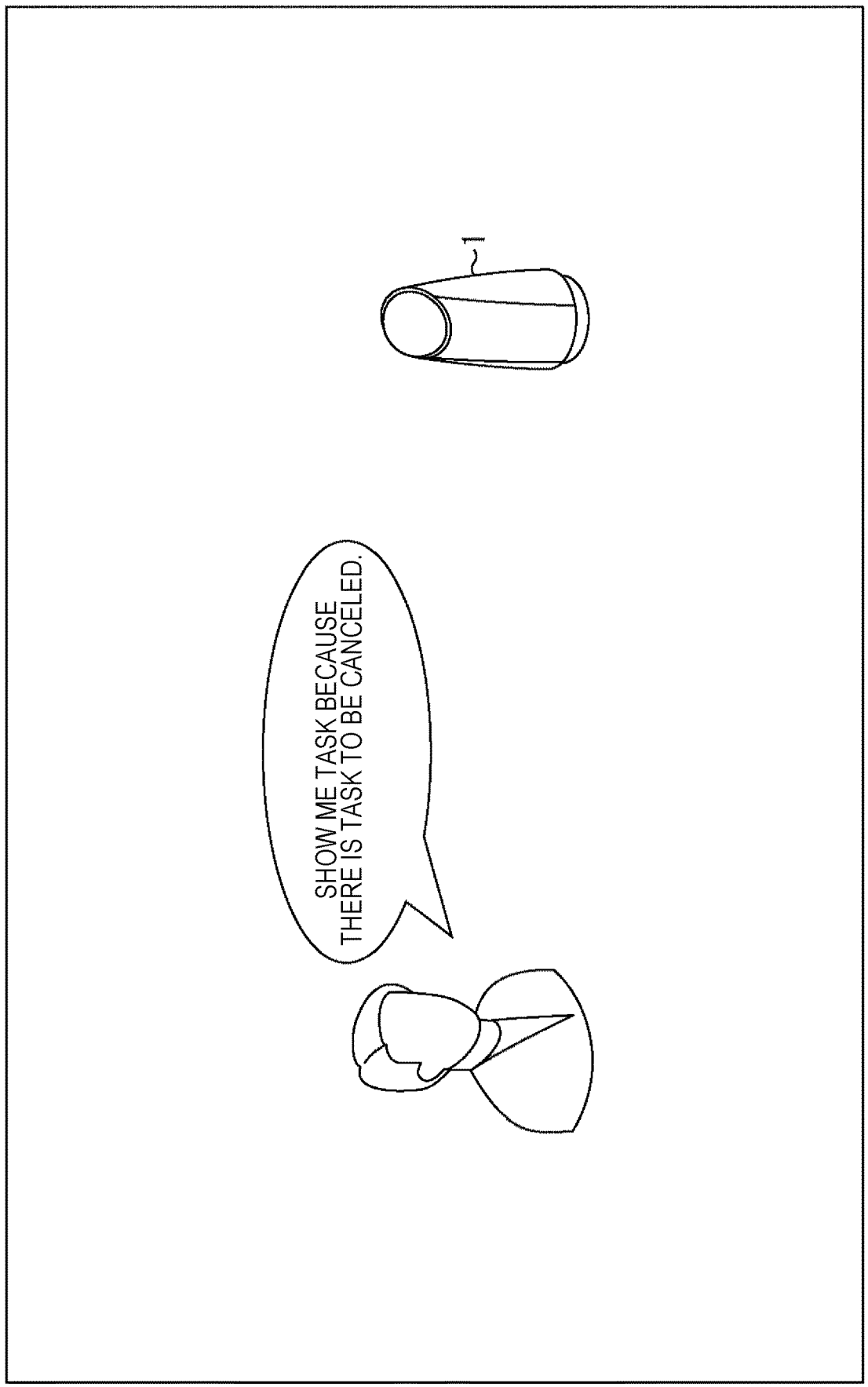
FIG. 15 is a diagram illustrating an example of input using voice.

FIG. 15 is a diagram illustrating an example of input using a voice.

Here, a case where the user requests presentation of registered tasks by speaking "show me task because there is task to be canceled" as illustrated in a word balloon of FIG. 15 will be described.

The information presenting server 2 manages the tasks of the user of the information processing terminal 1. The registration of the task may be performed by the user requesting registration of the task to the information processing terminal 1 by voice or may be performed by the user operating another device such as a cellular phone.

It is assumed that, for example, "soccer" is registered in the information presenting server 2 as a task repeated on Saturdays. In the information presenting server 2, voice recognition and the like are performed, and information of the registered tasks is read from the presentation information DB 163 on the basis of the speech of the user.

The information of the registered tasks is transmitted to the information processing terminal 1 as the presentation information and presented by the information processing terminal 1. The user selects a predetermined task from the registered tasks presented by the information processing terminal 1 and requests cancellation.

Figure 16:
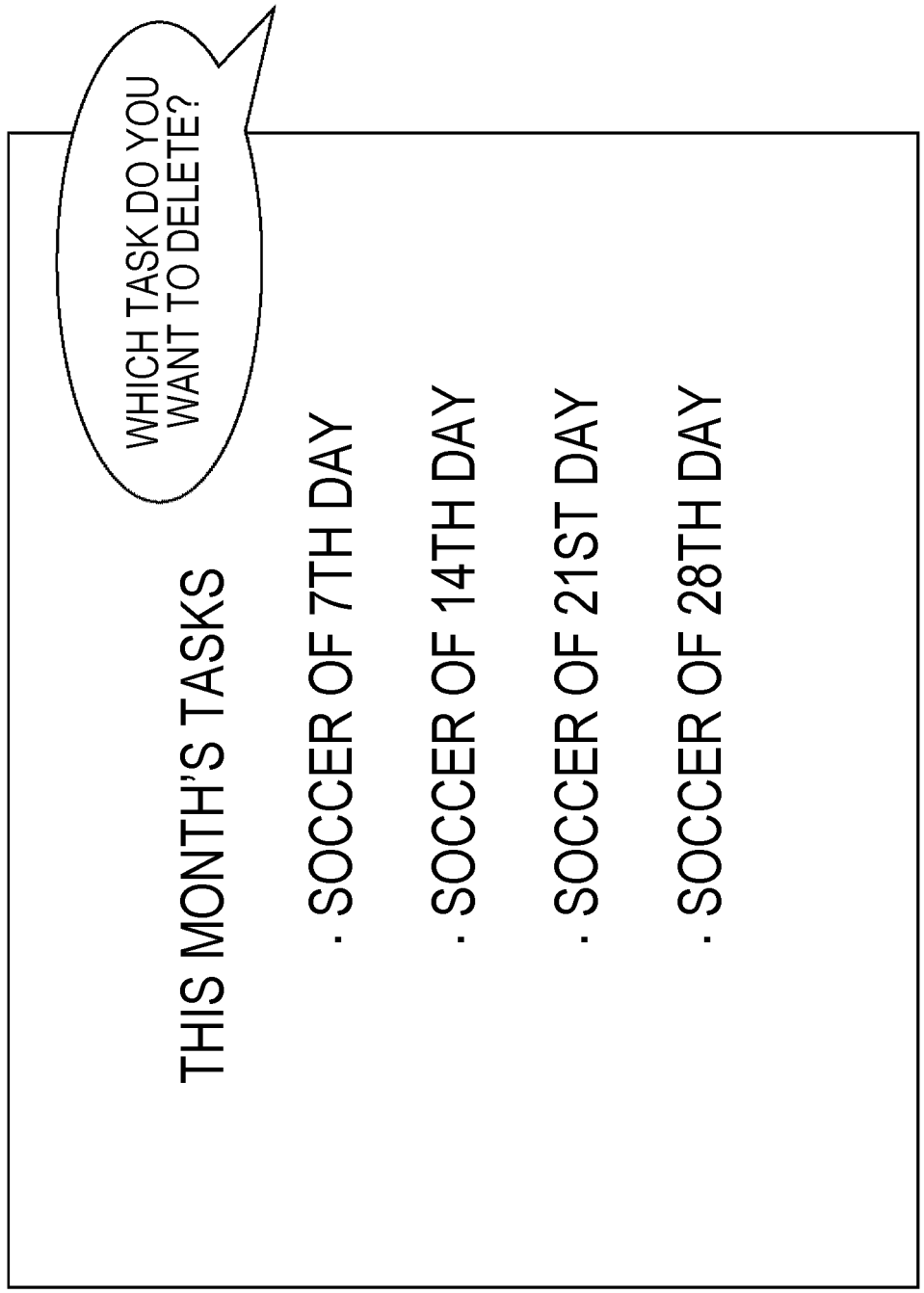
FIG. 16 is a diagram illustrating a registered task display example.

FIG. 16 is a view illustrating a registered task display example.

For example, the information processing terminal 1 displays a list illustrated in FIG. 16 and outputs a voice such as "which task do you want to delete?" as illustrated in a word balloon. The list illustrated in FIG. 16 is a screen for selecting a task which is a deletion target.

In the example of FIG. 16, four tasks of "soccer of 7th day", "soccer of 14th day", "soccer of 21st day"" and "soccer of 28th day" are displayed as the choices of the deletion target as this month's tasks.

In a case where only four characters "soccer" are displayed in the list, and the user is allowed to select the task to be deleted by voice, the user is likely to select "soccer" which is not intended by the user since all the characters have the same pronunciation.

In order to prevent a process not intended by the user from being performed, the list is displayed in a form in which a date in which a corresponding task is registered is added to the characters "soccer" as illustrated in FIG. 16. For example, in a case where the first "soccer" task is selected, the user speaks "soccer of 7th day".

As described above, in a case where repeated tasks are presented as the choices, information for distinguishing each task such as a date and time or a place is added to the character string indicating the task by the presentation method control unit 165.

Figure 17:
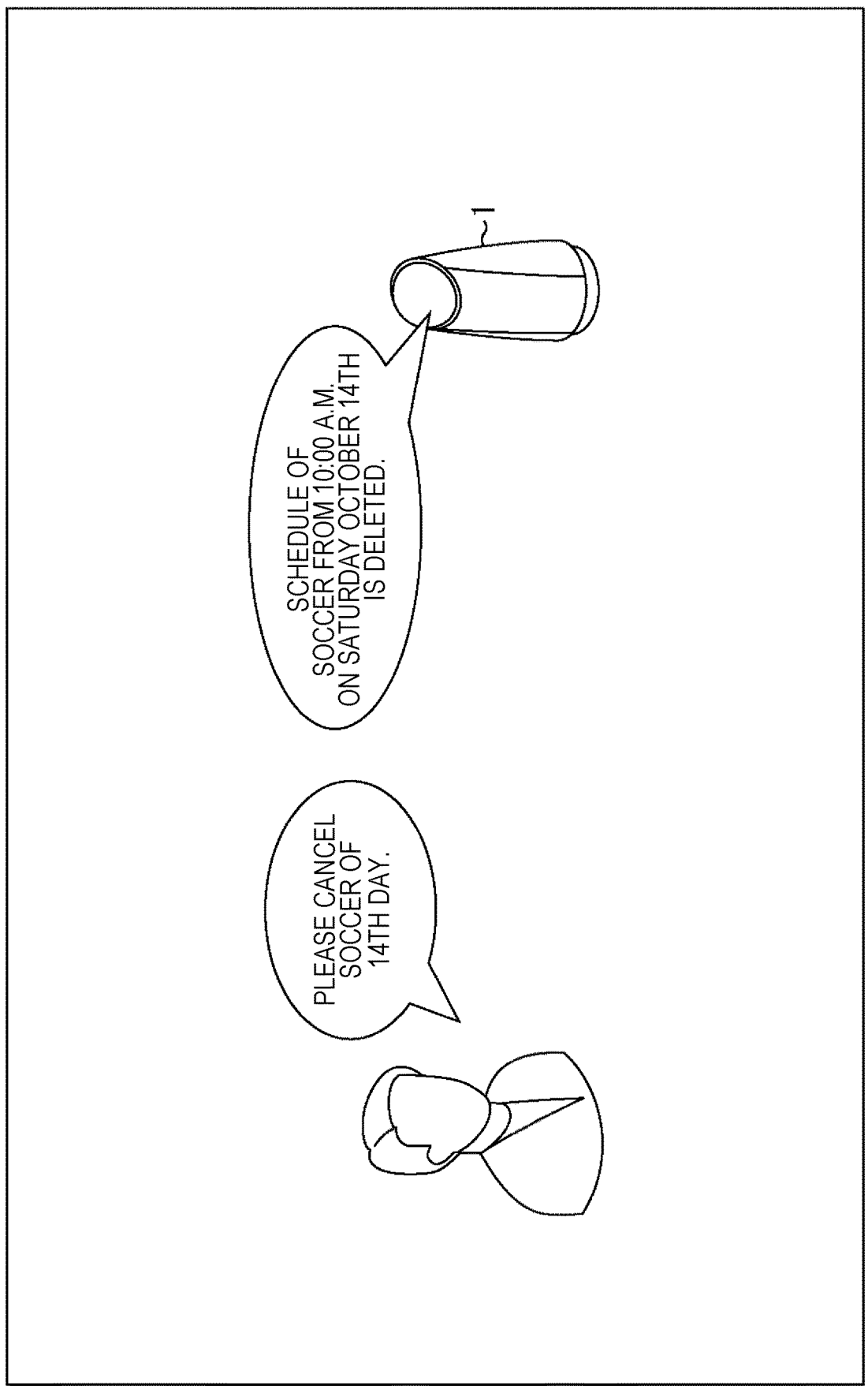
FIG. 17 is a diagram illustrating a deletion target selection example.

FIG. 17 is a diagram illustrating a deletion target selection example.

For example, in a case where the user speaks "Please cancel soccer of 14th day.", the voice recognition and the like are performed, and deletion of the task "soccer of 14th day" is accepted. Further, in accordance with the request of the user, a voice "Schedule of soccer at 10:00A.M. on Saturday, October 14th is deleted." is output from the information processing terminal 1.

As described above, in a case where the information presented as the choice is similar, information that does not cause misrecognition is appropriately added and presented to the user. The information presenting server 2 can prevent the misrecognition in a case where the user selects a predetermined choice by voice.

MODIFIED EXAMPLES

Various types of presentation methods can be employed to prevent misrecognition of selection of the user using a voice.

Example of Adding Numbers to Choices

Numbers may be added to choices. Accordingly, the user can speak a number and select a choice to which the number is added.

In this case, when a number is included in the name of the choice, it is unable to be determined whether the number spoken by the user is the number included in the name of the choice or the number added to the choice. Therefore, in this case, information which is less likely to cause misrecognition may be added to the choice and presented to the user.

For example, it is assumed that numbers are added to "Restaurant fifth avenue (resutoran goban machi)", "Ramen first star (ramen ichiban boshi)", "Chinese second star (Chyuka niban boshi)", "Grilled meat third house (yakiniku sanban kan)", and "Food market (Kui mono ichiba))", and the choices are presented as follows:

1. Restaurant fifth avenue (resutoran goban machi)
2. Ramen first star (ramen ichiban boshi)
3. Chinese second star (Chyuka niban boshi)
4. Grilled meat third house (yakiniku sanban kan)
5. Food market (Kui mono ichiba)

If the user speaks "ichiban", it is unable to be understood whether "1. Restaurant fifth avenue (resutoran goban machi)" is selected, "2. Ramen first star (ramen ichiban boshi)" is selected, or "5. Food market. (Kui mono ichiba))" is selected due to an error in voice recognition.

In the presentation method control unit 165 of the information presenting server 2, in a case where the number of is included the name of the choice or in a case where numbers having similar pronunciations (for example, ichiban and ichiba) are included, the number is not added to the name, or the number itself is added to the name, and the choices are presented. Further, the presentation method control unit 165 adds non-numeric information such as a letter (A, B, C, . . . ) to the name and presents the choices.

Example of Adjusting Display Order

Further, in a case where a plurality of choices are displayed across a plurality of pages (screens), a display order of the choices may be controlled such that choices having similar pronunciation are not included in the same screen. In this case, only choices having non-similar pronunciation are displayed in one screen.

Example of Adjusting Display in Accordance with Attribute of User

The display of the choices may be changed in accordance with the attribute of the user to whom the choices are presented. In this case, in the presentation method control unit 165, for example, a voice supplied from the microphone 55 or an image captured by the camera 56 is analyzed, and attributes such as an age and a sex of the user are specified.

For example, even though a part of difficult kanji is emphasis-displayed to a young user, the young user is unlike to read the kanji. In this case, the presentation method control unit 165 adds information such as reading sounds, converts it to a hiragana, or adds a picture which is easy to select (for example, a picture of a rabbit, a picture of a bear, or the like) and causes the information processing terminal 1 to present the choices.

Example of Adjusting Display in Accordance with Degree of Difficulty of Speaking The choices may be presented to avoid emphasis-displaying of parts of text that are difficult to read as listed below:
foreign languages (English, alphabet notations, or the like)
kanji which is hard to read (such as "牛蒡 (Gobou)" or "欠伸 (Akubi)")
unique way of speaking, words having reading sounds (Internet terminology, nicknames of artist names, or the like)
kanji which is easy to misread ("牛車" read as "gissha" and "古文書" read as "komonjo", or the like)
words which are easy to misunderstand ("緑 and 綠 (green and rim)", "萩原 and 荻原 (hagiwara and ogiwara)", "227 and 277", "z77 and 2z7", or the like)

Example of Emphasis-Displaying Plurality of Locations

For one choice, a plurality of parts may be emphasis-displayed and presented to the user.

Further, in a case in a case where one choice is presented, when there are a plurality of parts that can be candidates to be emphasis-displayed, one part to be emphasis-displayed may be selected on the basis of whether it is a word easy to say, a general word, or the like. It is determined whether it is a word easy to say, a general word, or the like, for example, on the basis of statistical information related to the frequency of expressions used in collected speeches of the user data, web sites, or the like.

Presentation Using Voice

Figure 18:
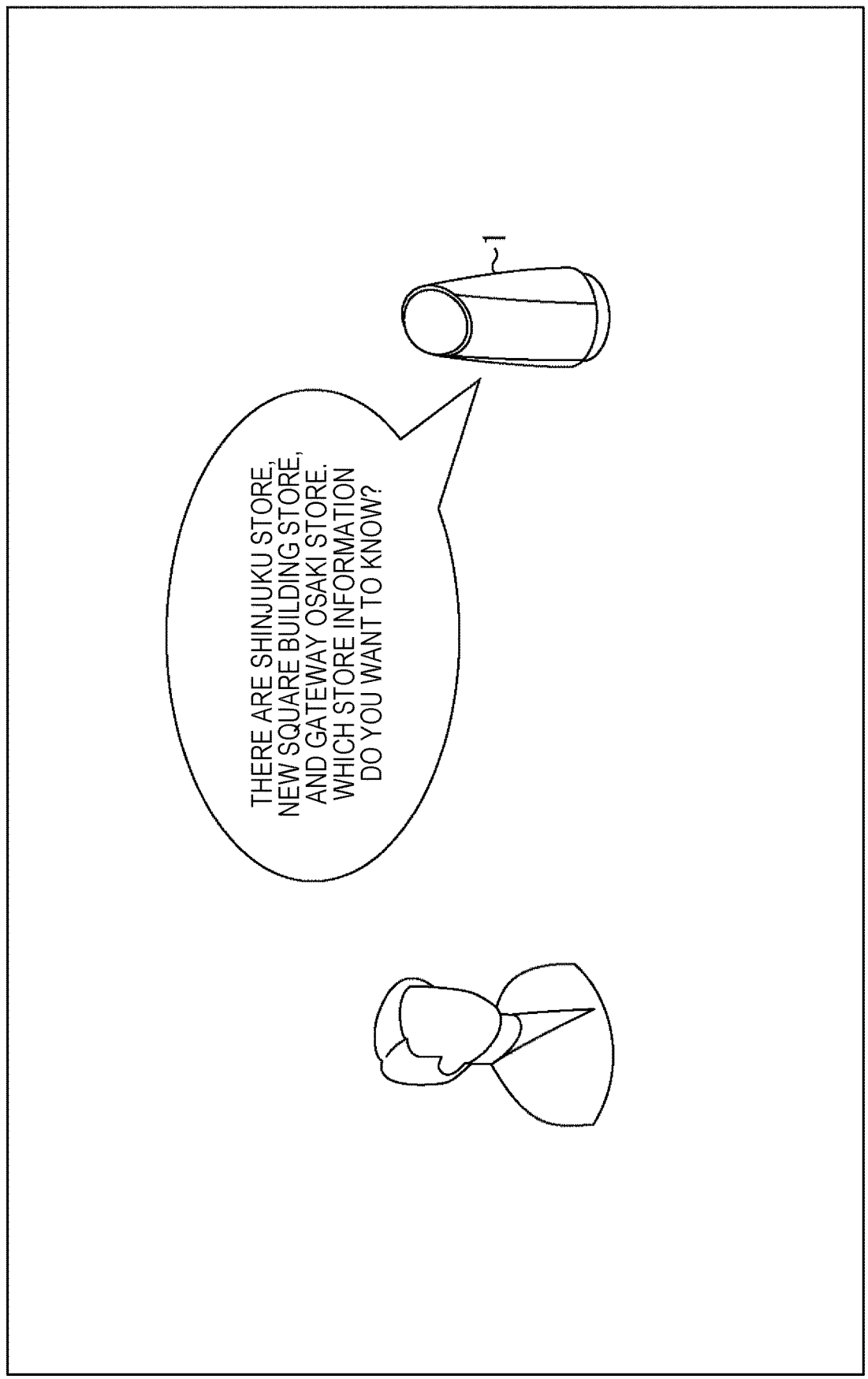
FIG. 18 is a diagram illustrating a presentation example by voice.

FIG. 18 is a diagram illustrating a presentation example by voice.

Figure 3:
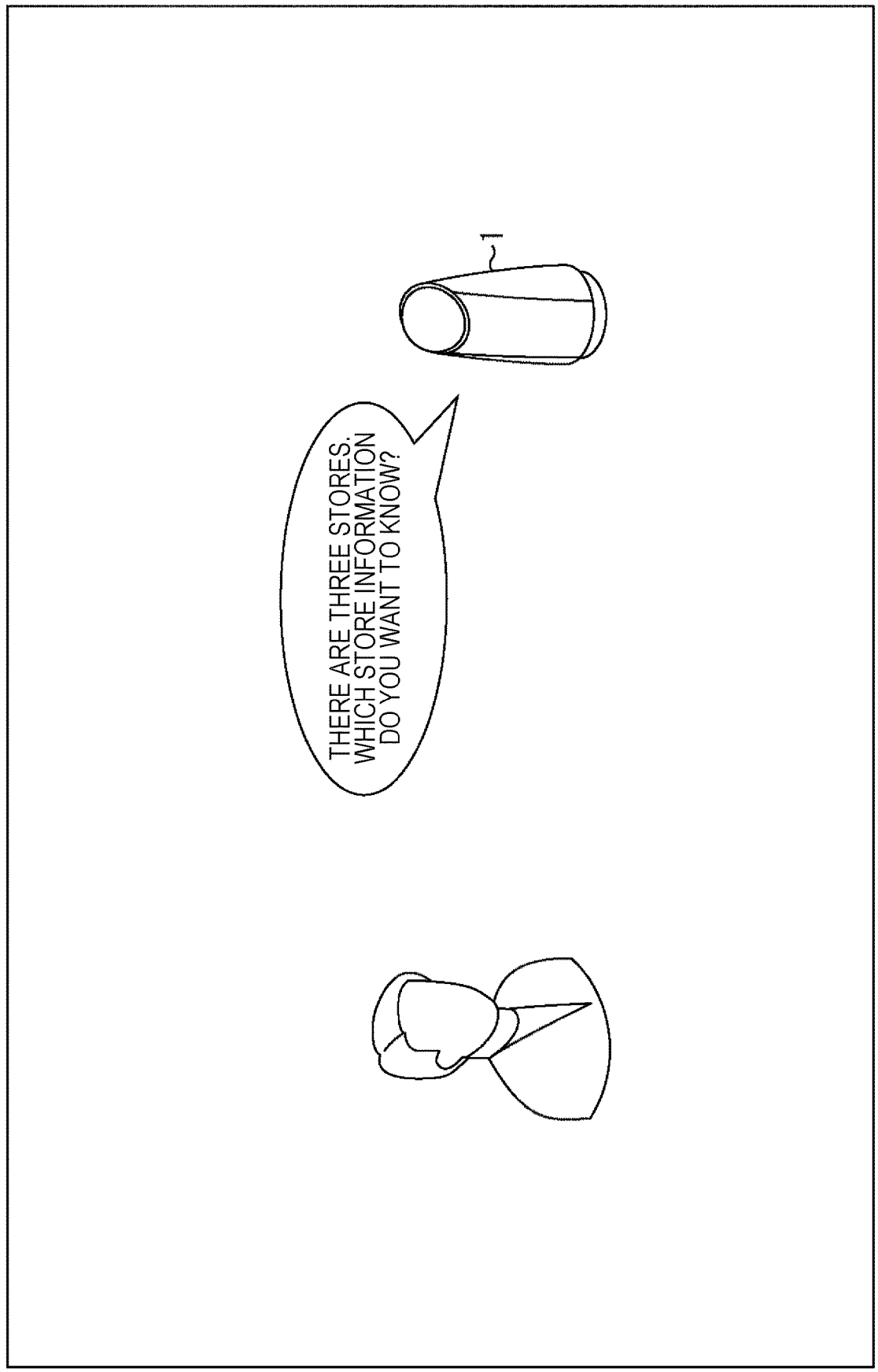
FIG. 3 is a diagram illustrating a presentation example by voice.

Even in a case where the choices such as the search results are presented to the user by voice instead of the screen display, parts having non-similar pronunciation are presented. For example, a case where the transactions described with reference to FIGS. 2 to 4 are performed, and the search results R1 to R3 are acquired will be described.

In this case, "There are Shinjuku store, new square building store, and gateway Osaki store." are presented by voice as the search results as illustrated in a word balloon of FIG. 18. The search results R1 to R3 are respectively represented by voices of parts having non-similar pronunciation "Shinjuku store", "new square building store", and "gateway Osaki store".

The user listens to the voice and speaks, for example, "Shinjuku store", or the like and selects the store of the search result R1.

As described above, in a case where the choices are presented by voice, parts having similar pronunciations are not spoken in order to prevent misrecognition. Accordingly, it is possible to emphasis-display specific parts even in a case where the choices are presented by voice.

In a case where the choices are presented by voice, not only a specific part may be spoken, but also the specific part may be emphasized and presented depending on strength of the speech during reading.

The presentation methods described above can be used in combination appropriately. For example, in a case where numbers are added to the choices, the added numbers may be emphasis-displayed.

OTHER EXAMPLES

Since there is a possibility that the user may also misread, in a case where a speech similar to the way of reading of the part presented by emphasis-displaying is performed, the process may be performed while determining the choice including the part is selected. Further, an inquiry of whether the choice including the part on which the similar speech has been performed has been selected may be given to the user.

Although presentation of information is performed in response to the request from the user, presentation of information using emphasis-displaying described above can be applied or the like even in a case where information to be recommended to the user is proactively presented from the information presenting server 2 side.

In the above example, various types of processes have been described as being performed in the information presenting server 2, but at least some of the functions of the information presenting server 2 described above may be executed in the information processing terminal 1.

In this case, at least some of the functional units of the information processing unit 151 illustrated in FIG. 10 are installed in the information processing terminal 1. The information to be presented to the user is obtained from the presentation information DB 163 which is a database in the information processing terminal 1 or from a server on the Internet 3.

As described above, the components of the information processing unit 151 to be installed on the information processing terminal 1 side or the information presenting server 2 side can be arbitrarily selected.

For example, the voice recognizing unit 161 and the semantic analysis unit 162 may be installed in the information processing terminal 1, and the presentation information DB 163, the presentation information acquiring unit 164, and the presentation method control unit 165 may be installed in the information presenting server 2.

Further, the voice recognizing unit 161, the semantic analysis unit 162, the presentation information acquiring unit 164, and the presentation method control unit 165 may be installed in the information processing terminal 1, and only the presentation information DB 163 may be installed in the information presenting server 2.

A series of processes described above can be performed by hardware or software. In a case where a series of processes is executed by software, a program constituting the software is installed in a computer incorporated in dedicated hardware, a general-purpose personal computer from a program recording medium, or the like.

The program to be installed is provided in a form in which it is recorded in the removable medium 111 illustrated in FIG. 9 including an optical disc (a compact disc-read only memory (CD-ROM), a digital versatile disc (DVD), or the like), a semiconductor memory, or the like. Further, the program may be provided via a wired or wireless transmission medium such as a local area network, the Internet, or digital broadcasting. The program may be installed in the ROM 102 or the storage unit 108 in advance.

Further, the program executed by the computer may be a program that performs the processes chronologically in accordance with the order described in this specification or a program that performs the processes in parallel or at necessary timing such as when calling is performed.

In this specification, a system refers to an aggregate of a plurality of components (devices, modules (parts), or the like), and it does not matter whether or not all the components are in the same housing. Therefore, a plurality of devices which are housed in separate housings and connected via a network, and a single device in which a plurality of modules are housed in one housing are all systems.

The effects described in this specification are merely illustrative and not limited and may have other effects.

An embodiment of the present technology is not limited to the embodiments described above, and various modifications can be made without departing from the scope of the present technology.

For example, the present technology may have a configuration of cloud computing in which one function is shared and processed by a plurality of devices via a network.

Further, steps described in the above flowchart may be executed by one device or may be shared and executed by a plurality of devices.

Further, in a case where a plurality of processes are included in one step, a plurality of processes included in one step can be executed by one device or may be shared by executed by a plurality of devices.

Example of Combination of Configurations

The present technology can also have the following configurations.

(1)

An information processing device, including:

an acquiring unit that acquires a plurality of pieces of presentation information to be presented as choices; and a presentation control unit that causes a part which is not similar to the other presentation information among the respective pieces of presentation information to be presented in a form different from a similar part.

(2)

The information processing device according to (1), in which the presentation information is a choice selected by voice, and the presentation control unit causes a part having a pronunciation not similar to the other presentation information to be presented in a form different from a part having a similar pronunciation.

(3)

The information processing device according to (2), in which the presentation control unit causes the part which is not similar to the other presentation information to be emphasized and presented.

(4)

The information processing device according to (3), in which the presentation control unit causes a part which is not included in a character string indicating a name of the other presentation information among character strings indicating names of the respective pieces of presentation information to be emphasized and presented.

(5)

The information processing device according to (1) or (2), in which the presentation control unit extracts information distinguishable from the other presentation information from metadata of the respective pieces of presentation information, adds the extracted in formation, and causes the respective pieces of presentation information to be presented.

(6)

The information processing device according to (5), in which the presentation control unit extracts information indicating a feature of each piece of presentation information from the metadata.

(7)

The information processing device according to (1) or (2), in which, in a case where an image indicating content of the presentation information is presented, the presentation control unit extracts information distinguishable from the other presentation information from the image, adds the extracted information, and causes the respective pieces of presentation information to be presented.

(8)

The information processing device according to (7), in which the presentation control unit extracts information indicating a feature of a subject from the image.

(9)

The information processing device according to any one of (1) to (8), in which, is a case where a number is included in a character string indicating a name of the presentation information, the presentation control unit adds identification information other than the number to the name of each piece of presentation information, and causes the presentation information to be presented.

(10)

The information processing device according to any one of (1) to (9), in which the presentation control unit controls a display order of the respective pieces of presentation information such that the presentation information including the part which is similar to the other presentation information is not displayed on the same screen.

(11)

The information processing device according to any one of (1) to (10), in which the presentation control unit adds information corresponding to an attribute of a user who selects the presentation information by voice to a name of the presentation information and causes the presentation information to be presented.

(12)

The information processing device according to any one of (1) to (11), in which the presentation control unit selects a part which is not similar to the other presentation information among the respective pieces of presentation information on the basis of readability of each part.

(13)

An information processing method performed an information processing device, including:

acquiring a plurality of pieces of presentation information to be presented as choices; and causing a part which is not similar to the other presentation information among the respective pieces of presentation information to be presented in a form different from a similar part.

(14)

An information processing terminal, including:

a communication unit that receives a plurality of pieces of presentation information to be presented as choices which are transmitted from an information processing device connected via a network; and a presentation control unit that causes a part which is not similar to the other presentation information among the respective pieces of presentation information to be presented in a form different from a similar part on the basis of the plurality of pieces of received presentation information.

(15)

An information processing method performed by an information processing terminal, including:

receiving a plurality of pieces of presentation information to be presented as choices which are transmitted from an information processing device connected via a network; and causing a part which is not similar to the other presentation information among the respective pieces of presentation information to be presented in a form different from a similar part on the basis of the plurality of pieces of received presentation information.

REFERENCE SIGNS LIST

1 Information processing terminal
2 Information presenting server
51 CPU
55 Microphone
56 Camera
57 Speaker
58 Display
59 Image display device
151 Information processing unit
161 Voice recognizing unit
162 Semantic analysis unit
163 Presentation information DB
164 Presentation information acquiring unit
165 Presentation method control unit

The invention claimed is:

1. An information processing device, comprising:
an acquiring unit configured to acquire a plurality of pieces of presentation information to be presented as choices on a same screen; and
a presentation control unit configured to cause a part of each piece of presentation information which is not similar to other pieces of presentation information among the plurality of pieces of presentation information to be presented in a form different from a part of each piece of presentation information which is similar to at least one part of the other pieces of presentation information among the plurality of pieces of presentation information,
wherein the part of each piece of presentation information which is not similar and the part of each piece of presentation information which is similar are determined according to a degree of pronunciation similarity among the plurality of pieces of presentation information,
wherein when pieces of presentation information are to be presented on a plurality of screens, the acquiring unit acquires the plurality of pieces of presentation information to be presented as the choices on the same screen from among the pieces of presentation information to be presented on the plurality of screens according to a degree of pronunciation similarity among the pieces of presentation information to be presented on the plurality of screens, and wherein the acquiring unit and the presentation control unit are each implemented via at least one processor.

2. The information processing device according to claim 1, wherein the presentation information includes the choices which are selected by voice, and the presentation control unit causes a part having a pronunciation not similar to the other presentation information to be presented in a form different from a part having a similar pronunciation.

3. The information processing device according to claim 2, wherein the presentation control unit causes the part which is not similar to the other presentation information to be emphasized and presented.

4. The information processing device according to claim 3, wherein the presentation control unit causes a part which is not included in a character string indicating a name of the other presentation information among character strings indicating names of the respective pieces of presentation information to be emphasized and presented.

5. The information processing device according to claim 1, wherein the presentation control unit extracts information distinguishable from the other presentation information from metadata of the respective pieces of presentation information, adds the extracted information, and causes the respective pieces of presentation information to be presented.

6. The information processing device according to claim 5, wherein the presentation control unit extracts information indicating a feature of each piece of presentation information from the metadata.

7. The information processing device according to claim 1, wherein, in a case where an image indicating content of the presentation information is presented, the presentation control unit extracts information distinguishable from the other presentation information from the image, adds the extracted information, and causes the respective pieces of presentation information to be presented.

8. The information processing device according to claim 7, wherein the presentation control unit extracts information indicating a feature of a subject from the image.

9. The information processing device according to claim 1, wherein, in a case where a number is included in a character string indicating a name of the presentation information, the presentation control unit adds identification information other than the number to the name of each piece of presentation information, and causes the presentation information to be presented.

10. The information processing device according to claim 1, wherein the presentation control unit controls a display order of the respective pieces of presentation information such that the presentation information including the part which is similar to the other presentation information is not displayed on the same screen.

11. The information processing device according to claim 1, wherein the presentation control unit adds information corresponding to an attribute of a user who selects the presentation information by voice to a name of the presentation information and causes the presentation information to be presented.

12. The information processing device according to claim 1, wherein the presentation control unit selects a part which is not similar to the other presentation information among the respective pieces of presentation information on a basis of readability of each part.

13. An information processing method performed by an information processing device, comprising:

acquiring a plurality of pieces of presentation information to be presented as choices on a same screen; and causing a part of each piece of presentation information which is not similar to other pieces of presentation information among the plurality of pieces of presentation information to be presented in a form different from a part of each piece of presentation information which is similar to at least one part of the other pieces of presentation information among the plurality of pieces of presentation information, wherein the part of each piece of presentation information which is not similar and the part of each piece of presentation information which is similar are determined according to a degree of pronunciation similarity among the plurality of pieces of presentation information, and wherein when pieces of presentation information are to be presented on a plurality of screens, the plurality of pieces of presentation information to be presented as the choices on the same screen are acquired from among the pieces of presentation information to be presented on the plurality of screens according to a degree of pronunciation similarity among the pieces of presentation information to be presented on the plurality of screens.

14. An information processing terminal, comprising:

a communication unit configured to receive a plurality of pieces of presentation information to be presented as choices which are transmitted from an information processing device connected via a network; and a presentation control unit configured to cause a part of each piece of presentation information which is not similar to other pieces of presentation information among the plurality of pieces of presentation information to be presented in a form different from a similar part of each piece of presentation information on a basis of the plurality of pieces of received presentation information, wherein the part of each piece of presentation information which is not similar and the similar part of each piece of presentation information are determined according to a degree of pronunciation similarity among the plurality of pieces of presentation information, wherein when pieces of presentation information are to be presented on a plurality of screens, the plurality of pieces of presentation information to be presented as the choices on the same screen are determined from among the pieces of presentation information to be presented on the plurality of screens according to a degree of pronunciation similarity among the pieces of presentation information to be presented on the plurality of screens, and wherein the communication unit and the presentation control unit are each implemented via at least one processor.

15. An information processing method performed by an information processing terminal, the method comprising:

receiving a plurality of pieces of presentation information to be presented as choices which are transmitted from an information processing device connected via a network; and causing a part of each piece of presentation information which is not similar to other pieces of presentation information among the plurality of pieces of presentation information to be presented in a form different from a similar part of each piece of presentation information on a basis of the plurality of pieces of received presentation information, wherein the part of each piece of presentation information which is not similar and the similar part of each piece of presentation information are determined according to a degree of pronunciation similarity among the plurality of pieces of presentation information, and wherein when pieces of presentation information are to be presented on a plurality of screens, the plurality of pieces of presentation information to be presented as the choices on the same screen are determined from among the pieces of presentation information to be presented on the plurality of screens according to a degree of pronunciation similarity among the pieces of presentation information to be presented on the plurality of screens.

* * * * *